US009527405B2

(12) United States Patent
Takeyama

(10) Patent No.: US 9,527,405 B2
(45) Date of Patent: Dec. 27, 2016

(54) VEHICLE WITH FUEL CELL MOUNTED THEREIN

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/887,619

(22) Filed: Oct. 20, 2015

(65) Prior Publication Data
US 2016/0121752 A1  May 5, 2016

(30) Foreign Application Priority Data

Nov. 4, 2014  (JP) .............................. 2014-224117A

(51) Int. Cl.
| | |
|---|---|
| B60L 11/18 | (2006.01) |
| B60K 1/04 | (2006.01) |
| H01M 8/24 | (2016.01) |
| H01M 8/02 | (2016.01) |

(52) U.S. Cl.
CPC .............. *B60L 11/1896* (2013.01); *B60K 1/04* (2013.01); *B60L 11/1883* (2013.01); *H01M 8/0273* (2013.01); *H01M 8/248* (2013.01); *B60K 2001/0422* (2013.01); *B60K 2001/0438* (2013.01); *H01M 2250/20* (2013.01)

(58) Field of Classification Search
CPC .... Y02E 60/50; Y02T 90/32; H01M 2250/50; H01M 8/2475; H01M 8/248
See application file for complete search history.

(56) References Cited

U.S. PATENT DOCUMENTS

| | | | | |
|---|---|---|---|---|
| 4,689,280 | A | * 8/1987 | Gionfriddo | ......... H01M 8/0228 429/469 |
| 5,392,873 | A | * 2/1995 | Masuyama | ............. B60R 16/04 180/68.5 |
| 5,547,777 | A | * 8/1996 | Richards | ............... H01M 8/247 429/210 |

(Continued)

FOREIGN PATENT DOCUMENTS

| | | |
|---|---|---|
| JP | 2007-015589 | 1/2007 |
| JP | 2013-001343 | 1/2013 |
| JP | 2013-206855 | 10/2013 |

*Primary Examiner* — Brodie Follman
(74) *Attorney, Agent, or Firm* — Finnegan, Henderson, Farabow, Garrett & Dunner, LLP

(57) ABSTRACT

A vehicle includes a fuel cell having a cell stack and an end plate provided to receive pressing force, the end plate having such a strength as to resist the pressing force; and a vehicle-side stack frame on which the fuel cell is mounted in a vehicle underfloor region in such a mounting posture that fuel-cell unit cells are stacked horizontally. The vehicle-side stack frame is built over a range from an end plate side to the other end side of the cell stack in the stacking direction of the fuel-cell unit cells in an occupation area occupied by the fuel cell in the mounting posture in the vehicle underfloor region. In a region where it is assumed that external force can reach the occupation area in the vicinity of the end plate, the vehicle-side stack frame has a shortest distance to the end plate that is smaller than a shortest distance to any other members in the vicinity of the end plate.

4 Claims, 6 Drawing Sheets

(56) References Cited

U.S. PATENT DOCUMENTS

| | | | | |
|---|---|---|---|---|
| 6,210,823 B1* | 4/2001 | Hatoh | H01M 8/247 429/465 |
| 6,218,039 B1* | 4/2001 | Mease | H01M 8/247 29/623.2 |
| 6,479,180 B1* | 11/2002 | Uozumi | H01M 8/02 429/153 |
| 6,613,470 B1* | 9/2003 | Sugita | H01M 8/0258 429/416 |
| 6,645,659 B2* | 11/2003 | Bisaka | H01M 8/248 429/454 |
| 6,663,995 B2* | 12/2003 | Rock | H01M 8/2475 429/470 |
| 6,720,101 B1* | 4/2004 | Dong | H01M 8/2475 429/435 |
| 6,855,448 B2* | 2/2005 | Kikuchi | H01M 8/247 180/68.5 |
| 6,874,588 B2* | 4/2005 | Kato | B60K 1/04 180/65.1 |
| 6,936,369 B1* | 8/2005 | Komura | H01M 8/0247 429/457 |
| 7,045,245 B2* | 5/2006 | Rock | H01M 8/2475 429/469 |
| 7,144,647 B2* | 12/2006 | Sugita | H01M 8/0271 180/65.1 |
| 7,261,964 B2* | 8/2007 | Andreas-Schott | H01M 8/2475 429/452 |
| 7,297,434 B2* | 11/2007 | Tanaka | H01M 8/0247 429/483 |
| 7,384,703 B2* | 6/2008 | Sato | H01M 8/02 429/434 |
| 7,494,736 B2* | 2/2009 | Hansell | H01M 8/0282 429/458 |
| 7,527,889 B2* | 5/2009 | Komura | H01M 8/0247 429/454 |
| 7,533,748 B2* | 5/2009 | Miyajima | H01M 8/247 180/68.5 |
| 7,560,187 B2* | 7/2009 | Inagaki | H01M 8/248 429/483 |
| 7,641,017 B2* | 1/2010 | Nozaki | B60K 1/04 180/291 |
| 7,659,027 B2* | 2/2010 | Tsunoda | H01M 8/04014 429/439 |
| 7,803,474 B2* | 9/2010 | Inagaki | H01M 8/0271 429/434 |
| 7,833,678 B2* | 11/2010 | Inagaki | H01M 8/247 429/467 |
| 7,836,999 B2* | 11/2010 | Kato | B62D 21/11 180/312 |
| 7,851,101 B2* | 12/2010 | Tanaka | H01M 8/247 429/452 |
| 7,901,828 B2* | 3/2011 | Inagaki | H01M 8/248 429/467 |
| 7,914,942 B2* | 3/2011 | Kato | B60K 1/04 429/507 |
| 7,951,502 B2* | 5/2011 | Inagaki | H01M 8/248 429/467 |
| 8,232,022 B2* | 7/2012 | Erikstrup | H01M 8/04067 429/433 |
| 8,361,669 B2* | 1/2013 | Niimi | B60L 11/1896 429/452 |
| 8,470,490 B2* | 6/2013 | Takeyama | H01M 8/2485 429/458 |
| 8,652,702 B2* | 2/2014 | Niezelski | H01M 8/2475 429/457 |
| 8,741,466 B2* | 6/2014 | Youngs | B60K 6/28 165/80.3 |
| 8,846,260 B2* | 9/2014 | Naito | H01M 8/0258 429/433 |
| 8,960,344 B2* | 2/2015 | Ozawa | B60K 1/04 180/68.1 |
| 8,967,312 B2* | 3/2015 | Yanagi | B60K 1/04 180/68.5 |
| 8,980,495 B2* | 3/2015 | Homma | H01M 8/04022 429/423 |
| 9,005,838 B2* | 4/2015 | Uehara | H01M 8/0273 429/467 |
| 9,070,937 B2* | 6/2015 | Niezelski | H01M 8/241 |
| 9,093,698 B2* | 7/2015 | Tanaka | H01M 8/2475 |
| 9,160,042 B2* | 10/2015 | Fujii | B60K 1/04 |
| 9,162,559 B2* | 10/2015 | Arisawa | B60K 1/04 429/400 |
| 9,166,234 B2* | 10/2015 | Takeyama | H01M 8/04089 |
| 9,166,235 B2* | 10/2015 | Katano | H01M 8/026 |
| 9,172,100 B2* | 10/2015 | Hotta | H01M 8/04029 |
| 9,259,998 B1* | 2/2016 | Leanza | B60K 1/04 |
| 9,281,505 B2* | 3/2016 | Hihara | B60K 1/04 |
| 9,283,838 B2* | 3/2016 | Ohashi | B60K 1/04 |
| 2002/0034673 A1* | 3/2002 | Bisaka | H01M 8/248 429/454 |
| 2003/0012998 A1* | 1/2003 | Bruck | B60K 1/04 429/454 |
| 2003/0062204 A1* | 4/2003 | Kato | B60K 1/04 180/65.1 |
| 2003/0215687 A1* | 11/2003 | Bruck | B60K 1/04 429/465 |
| 2005/0277012 A1* | 12/2005 | Inagaki | H01M 8/247 429/470 |
| 2006/0113131 A1* | 6/2006 | Kato | B60K 1/04 429/434 |
| 2006/0272877 A1* | 12/2006 | Nozaki | B60K 1/04 180/291 |
| 2007/0007054 A1* | 1/2007 | Nakashima | B60K 1/00 180/65.1 |
| 2007/0007060 A1* | 1/2007 | Ono | B60K 1/04 180/65.31 |
| 2007/0284167 A1* | 12/2007 | Watanabe | B60L 3/0046 180/68.5 |
| 2008/0094054 A1* | 4/2008 | Takeyama | B60L 3/0053 324/105 |
| 2014/0147769 A1* | 5/2014 | Takeyama | H01M 8/248 429/469 |
| 2016/0049681 A1* | 2/2016 | Takeyama | H01M 8/2465 429/469 |
| 2016/0121752 A1* | 5/2016 | Takeyama | B60L 11/1896 180/68.5 |

* cited by examiner

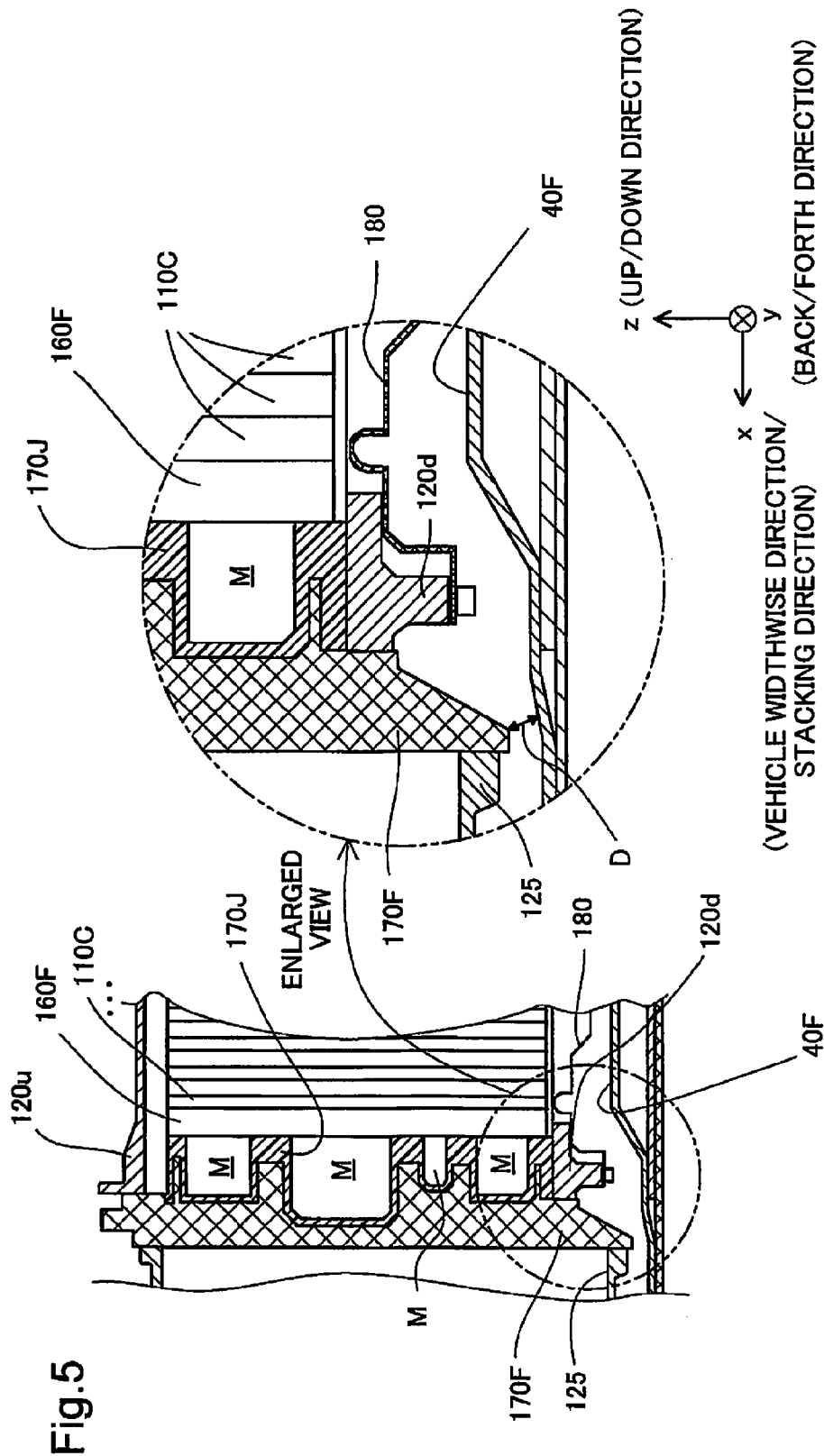

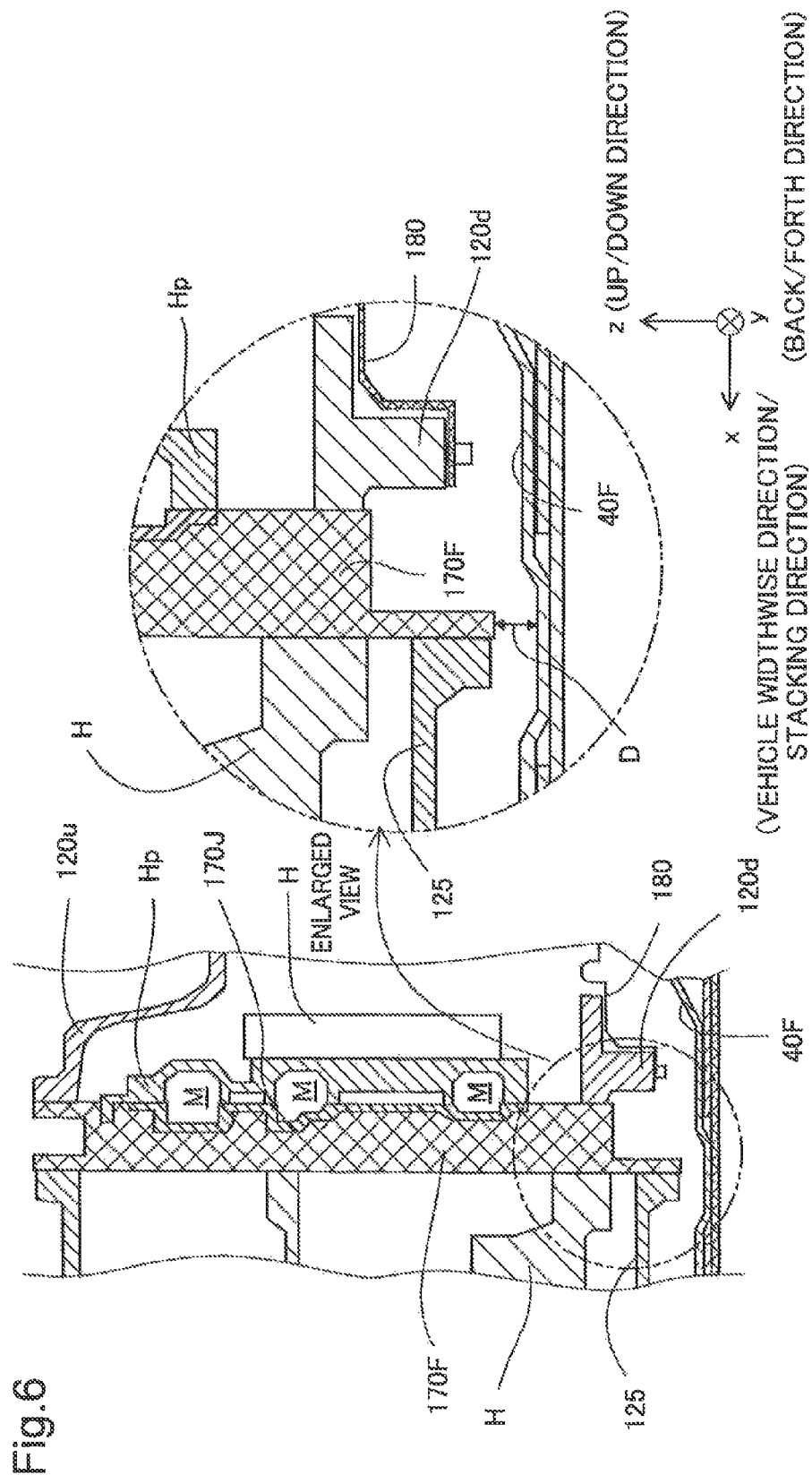

VEHICLE WITH FUEL CELL MOUNTED THEREIN

CROSS-REFERENCE TO RELATED APPLICATION

The present application claims priority from Japanese application JP2014-224117A filed on Nov. 4, 2014, the content of which is hereby incorporated by reference into this application.

BACKGROUND

The present invention relates to a vehicle.

RELATED ART

Vehicles in which a fuel cell is mounted as a new power source have been developed and advanced in recent years. For such vehicles, it has been proposed that a fuel cell is mounted under the vehicle floor with the aim of ensuring vehicle interior space (e.g., Japanese Patent Publication No. 4503502).

With the above-described structure, in which fuel cells are mounted on a sub-frame that ties up a main frame serving as a vehicle framework, it is desired that safety against external force that could reach the mounted fuel cells be as high as possible. For example, since traveling road surfaces for vehicles are of diverse and various kinds, it can occur that some protrusion from the road surface or some ricocheting object interferes with the sub-frame to cause external force to reach the sub-frame. In such an event, external force may act on the sub-frame, causing the sub-frame to be deformed, which could incur damage to fuel-cell unit cells constituting the fuel cell. Under these and other circumstances, configurations of fuel cell vehicles that are more desirable for various cases have been discussed.

SUMMARY

In order to solve at least part of the above-described problems, the present invention can be implemented in the following aspects:

(1) According to one aspect of the invention, a vehicles is provided. The vehicle may include; a fuel cell having a cell stack in which a plurality of fuel-cell unit cells are stacked in layers, and an end plate provided at one end portion of the cell stack to receive pressing force with which the cell stack is pressed in a direction of the stacking, the end plate having such strength as to resist the pressing force; and a vehicle-side stack frame on which the fuel cell is mounted in a vehicle-interior underfloor region in such a mounting posture that the fuel-cell unit cells are stacked horizontally. The vehicle-side stack frame may be built over a range from an end plate side to the other end side of the cell stack in the stacking direction of the fuel-cell unit cells in an occupation area occupied by the fuel cell in the mounting posture in the vehicle-interior underfloor region. In a region where it is assumed that external force can reach the occupation area in a vicinity of the end plate, the vehicle-side stack frame may be so structured as to have a shortest distance to the end plate that is smaller than a shortest distance to any one of the members constituting the fuel cell (hereinafter, referred to as fuel cell component members) in the vicinity of the end plate.

With this aspect adopted, the vehicle-side stack frame to be used for mounting of the fuel cell is built over a range from the end plate side to the other end side of the cell stack in the stacking direction of the fuel-cell unit cells in the occupation area of the fuel cell, and under this condition, the end plate is set closer to the vehicle-side stack frame than the fuel cell component members in the vicinity of the end plate. Therefore, in the event that external force has reached the occupation area of the fuel cell in the vicinity of the end plate, this external force is received first by the end plate via the vehicle-side stack frame. The end plate that first receives external force in this way, having such a strength as to resist the pressing force with which the cell stack is pressed in the stacking direction, evades a direct effect of the external force, or suppresses the external force that reaches in effect, from the vehicle-side stack frame onto the fuel cell component members such as the fuel-cell unit cells in the vicinity of the end plate. As a result of this, according to the vehicle of this aspect, damage to the fuel cell component members such as the fuel-cell unit cells can be reduced in the vicinity of the end plate.

(2) In the vehicle of the above-described aspect, the end plate may be set proximate to the vehicle-side stack frame on a vehicle driving road surface side on an assumption that the external force reaches the end plate in a direction from the vehicle driving road surface. In this case, even if an interference with some protrusion or ricocheting object from the vehicle driving road surface has occurred, damage to the fuel cell component members such as the fuel-cell unit cells can be reduced in the vicinity of the end plate.

(3) In the vehicle of the above-described aspects, the end plate may be so structured as to have a peripheral larger than a peripheral shape of whole of other members constituting the fuel cell as viewed in the stacking direction of the cell stack. In this case, just by providing the end plate at one end portion of the cell stack, the end plate can conveniently be set closer to the vehicle-side stack frame than the fuel cell component members.

The present invention may be implemented in various forms. For example, the invention can be implemented in such a form as an end plate for fuel cells, a fuel cell, or a mounting structure of fuel cells.

BRIEF DESCRIPTION OF DRAWINGS

The present disclosure is illustrated by way of example and not by way of limitation in the figures of the accompanying drawings, in which the like reference numerals indicate like elements and in which:

FIG. 5 is an explanatory view schematically showing a configuration of the front end-side end plate and its vicinity, as it is cut by line 5-5 of FIG. 4; and FIG. 6 is an explanatory view schematically showing a configuration of the front end-side end plate and its vicinity, as it is cut by line 6-6 of FIG. 4.

DESCRIPTION OF EMBODIMENTS

Hereinbelow, an embodiment of the present invention will be described, with reference to the accompanying drawings.

Figure 1:
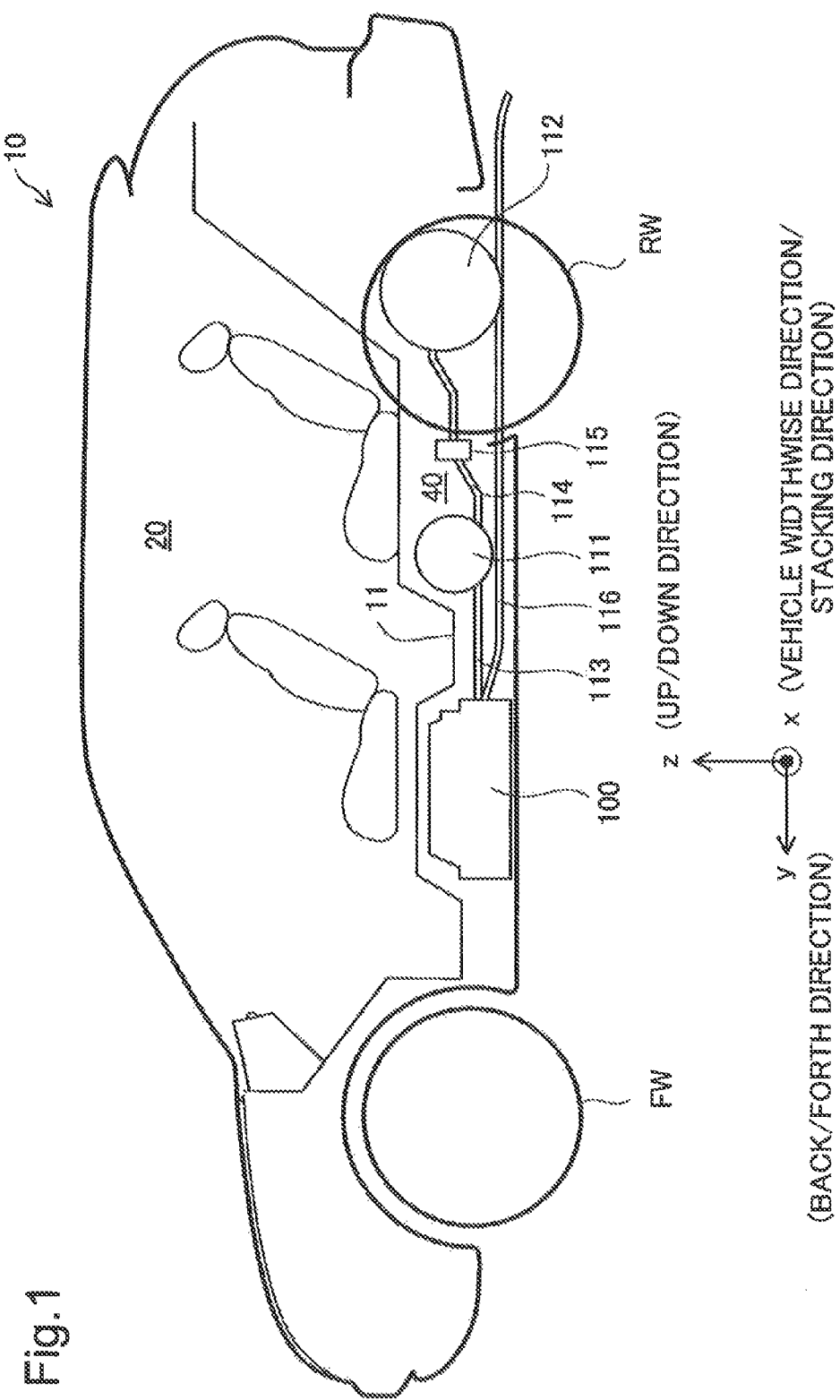
FIG. 1 is an explanatory view schematically showing a configuration of a vehicle as an embodiment of the present invention.

FIG. 1 is an explanatory view schematically showing a configuration of a vehicle 10 as an embodiment of the invention. The vehicle 10 of this embodiment includes a fuel cell 100, a first gas tank 111, and a second gas tank 112. The fuel cell 100 is mounted in a horizontal posture on a lower side of an underbody 11 partitioning a vehicle interior 20, i.e., in a vehicle-interior underfloor region 40 between front wheels FW and rear wheels RW under the floor of the vehicle interior 20, the horizontal posture being such that a later-described stacking direction of the fuel-cell unit cells is oriented along a widthwise direction of the vehicle. Hereinafter, as to directions of the vehicle, a vehicle's widthwise direction is represented by an x-axis, its back-and-forth direction is represented by a y-axis, and its up-and-down direction, i.e. vertical direction, is represented, by a z-axis, where the x-axis also represents a stacking direction of later-described fuel-cell unit cells 110C.

Both the first gas tank 111 and the second, gas tank 112 store hydrogen gas therein. Each gas tank is mounted below the underbody 11 in such a horizontal posture that its major axis is directed along the vehicle widthwise direction. Both gas tanks are mounted on one side of the fuel cell 100 closer to the rear wheels RW in the vehicle's back-and-forth direction. The second gas tank 112 is mounted between the mutually opposing rear wheels RW in such a horizontal posture as not to interfere with the axle of the rear wheels RW. The first gas tank 111 is mounted in a horizontal posture at an intermediate position between the fuel cell 100 and the second gas tank 112. The first gas tank 111 is connected to the fuel cell 100 via a first hydrogen supply pipe 113. Between the first gas tank 111 and the second gas tank 112, a second hydrogen supply pipe 114 is provided with an opening/closing valve 115 interposed thereon. The first hydrogen supply pipe 113 and the second hydrogen supply pipe 114 including the opening/closing valve 115 constitute a gas supply system. When an unshown ferrule valve as a tank attachment and the opening/closing valve 115 are driven by an unshown control device, hydrogen gases stored in the first gas tank 111 and the second gas tank 112 are supplied from the two gas tanks to the fuel cell 100. The fuel cell 100 receives not only the supply of hydrogen but also supply of air from an unshown air supply system to promote electrochemical reaction of hydrogen and oxygen so that electric power is generated. The generated power is transferred to an unshown motor so as to be used as driving force for the vehicle 10. In addition, the fuel cell 100 generates water as a reaction product of the hydrogen-and-oxygen electrochemical reaction. The generated water is discharged through a discharge pipe 116.

Figure 2:
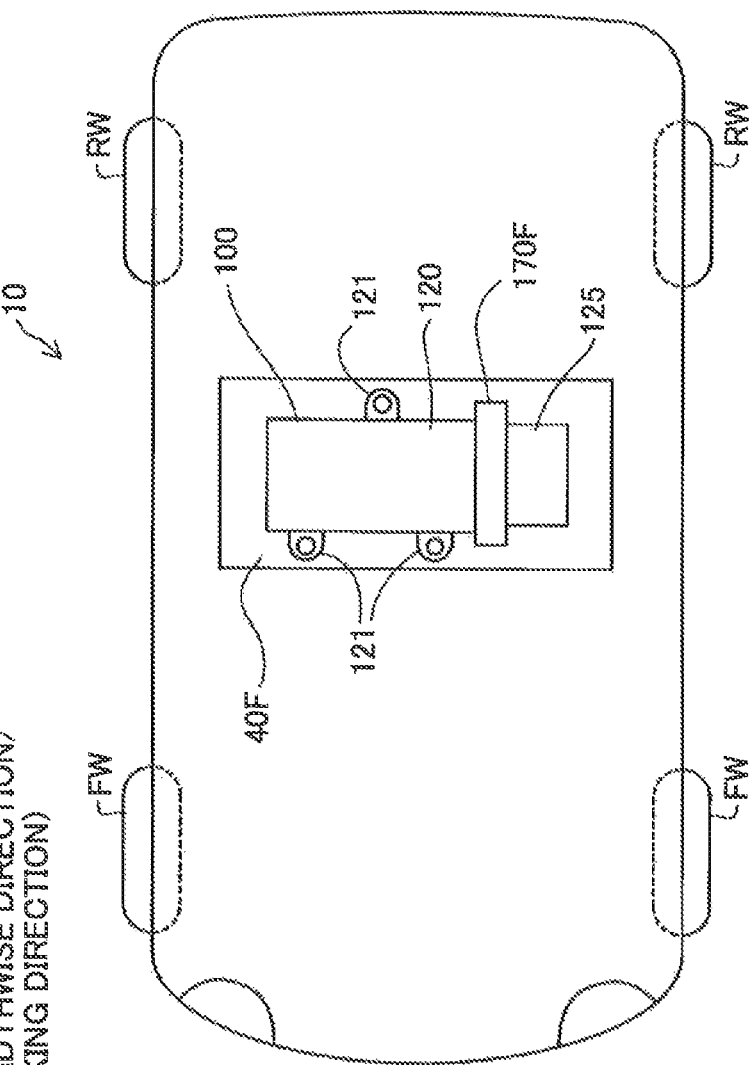
FIG. 2 is an explanatory view schematically showing a mounting state of a fuel cell in the vehicle as seen in a planar view.
Figure 3:
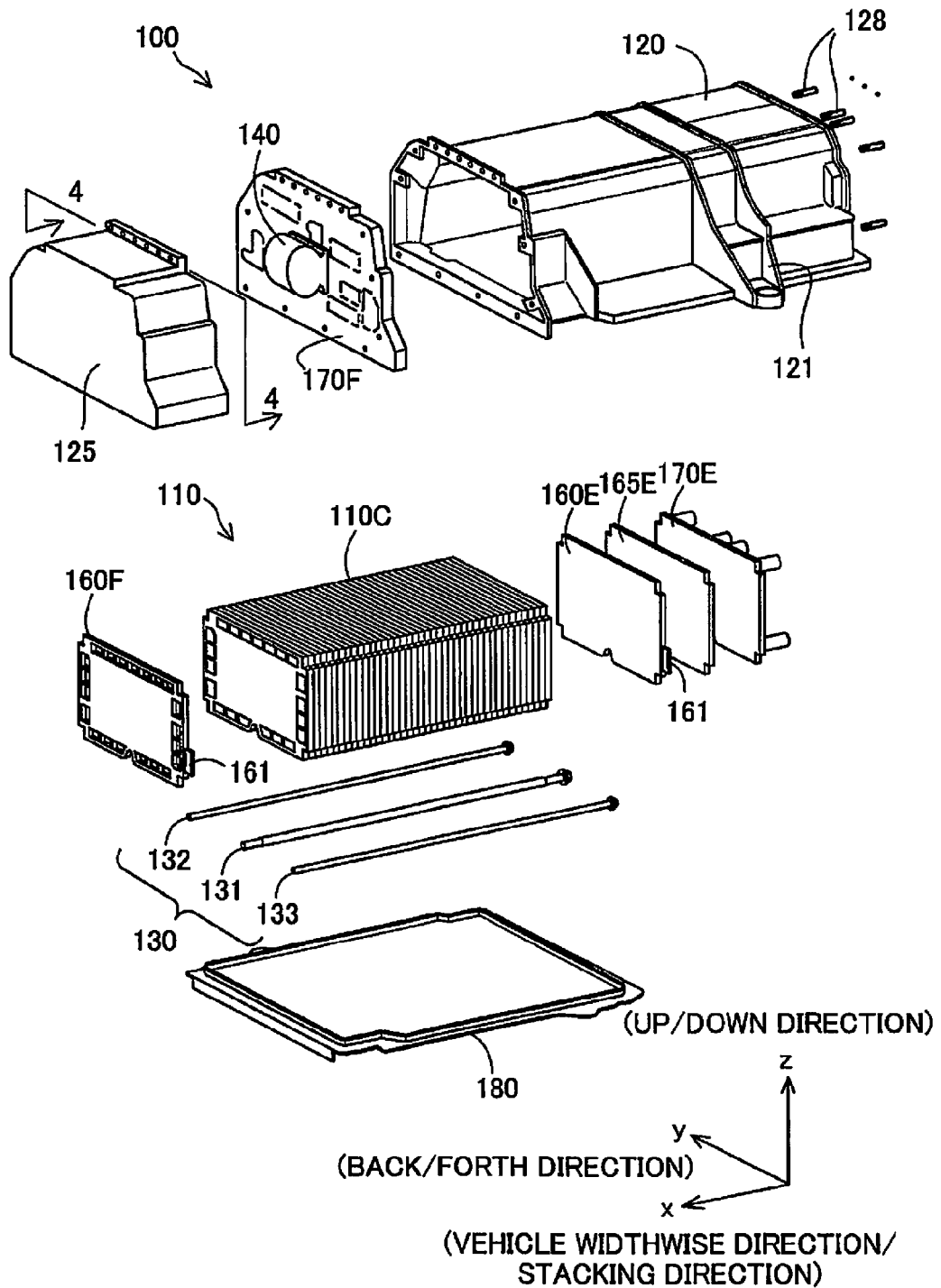
FIG. 3 is an exploded perspective view showing a schematic configuration of the fuel cells.

FIG. 2 is an explanatory view schematically showing a mounting state of the fuel cell 100 in the vehicle 10 as seen in a plan view. FIG. 3 is an exploded perspective view showing a schematic configuration of the fuel cell 100. As shown in the figures, the fuel cell 300 takes a mounting posture in which the stacking direction of fuel-cell unit cells 110C constituting a cell stack 110 is coincident with the x direction. Under this condition, the fuel cell 100 is mounted in the vehicle-interior underfloor region 40 (see FIG. 1) by a vehicle-side stack frame 40F shown in FIG. 2, In an occupation area occupied by the fuel cell 100 in the vehicle-interior underfloor region 40, the vehicle-side stack frame 40F is built or stretched on an unshown vehicle main frame so as to range from a front end-side end plate 170F side to the other end-portion side of the cell stack 110 in the stacking direction of the fuel-cell unit cells 110C shown in FIG. 3. As shown in FIGS. 2 and 3, the fuel cell 100 includes a fuel cell casing 120, and fixing legs 121 extending from both side faces of the fuel cell casing 120 are mounted on the vehicle-side stack frame 40F. Then, the fixing legs 121 are fixed to the vehicle-side stack frame 40F with unshown bolts, by which the fuel cell 100 is mounted and fixed to the vehicle-side stack frame 40F in the above-described mounting posture.

The fuel cell 100 mounted in this way includes a cell stack 110, three tension shafts 131, 132, 133 (also referred to collectively as tension shafts 130), a fuel cell casing 120, an auxiliary machinery cover 125, a lower-cover 180, and later-described various types of plates. The cell stack 110 is made up by stacking a plurality of layers of the fuel-cell unit cells 110C, each serving as a power generation unit, in the x-axis direction. A front end-side current-collecting plate 160F and the front end-side end plate 170F are provided as stacked layers on one end side of the cell stack 110, while a rear end-side current-collecting plate 160E, a rear end-side insulating plate 165E and a rear end-side end plate 170E are provided as stacked layers on the other end side of the stack. In addition, since the front end-side end plate 170F has an insulative resin coating layer over a region of contact with the front end-side current-collecting plate 160F, no insulating plate is needed on the front end side of the cell stack 110.

The fuel-cell unit cells 110C include an anode-side separator (not shown), a cathode-side separator (not shown), and a seal member-integrated MEA (Membrane Electrode Assembly) (not shown). As shown in FIG. 3, the fuel-cell unit cells 110C have, in their cell peripheral edge, a supply/discharge hole for supply and discharge of hydrogen gas, a supply/discharge hole, for supply and discharge of air, and a supply/discharge hole for supply and discharge of cooling water, these supply/discharge holes being connected to supply/discharge holes of the front end-side current-collecting plate 160F. The front end-side end plate 170F includes a manifold for supplying hydrogen, which is supplied from a set-up hydrogen pump 140, via the above-described individual front end-side plates to the fuel-cell unit cells 110C, as well as a manifold for supplying air as an oxidizing gas from an air supply pipe, which extends up to the auxiliary machinery cover 125, via the front end-side current-collecting plate 160F to the fuel-cell unit cells 110C. The front end-side end plate 170F also includes a manifold for supplying cooling water from a cooling water supply pipe, which extends up to the auxiliary machinery cover 125, via the front, end-side current-collecting plate 160F to the fuel-cell unit cells 110C. The front end-side end plate 170F further includes a manifold for discharging anode discharge gas, cathode discharge gas and cooling water from the individual fuel-cell unit cells 110C. Each of these manifolds formed in the front end-side end plate 170F are communicated with a gas-and-cooling water supply manifold and a gas-and-cooling water discharge manifold, respectively, these manifolds extending through the stacked fuel-cell unit cells 110C. In addition, around the above-mentioned supply/discharge holes and manifolds, unshown sealing portions are formed, by which sealability is ensured between separators and between the separators and the above individual plates after the stacking of the fuel-cell unit cells 110C. The front end-side end plate 170F is a cast molded article (die-cast article) of aluminum or other metal so as to allow the individual manifolds to be provided on top and bottom surfaces of the plates as well as inside the plates as already described. The aspect of manifold formation in the front end-side end plate 170F is not directly related to the gist of the invention and so its detailed description is omitted.

The front end-side current-collecting plate 160P and the rear end-side current-collecting plate 160E collect generated electric power of the individual fuel-cell unit cells 110C and deliver the power outside via current-collecting terminals 161. The front end-side current-collecting plate 160F has, in its peripheral edge, a supply/discharge hole similar to that of the fuel-cell unit cells 110C. The rear end-side current-collecting plate 160E has no such supply/discharge holes. The rear end-side insulating plate 165E is an insulative resin plate, and the rear end-side end plate 170E is a metal plate made from aluminum. The rear end-side insulating plate 165E and the rear end-side end plate 170E, like the rear end-side current-collecting plate 160E, have no supply/discharge holes corresponding to the above-described supply/discharge holes of the fuel-cell unit cells 110C. This is because the fuel cell 100 adopted in this embodiment is a type of fuel cell in which reactant gases (hydrogen, air) and cooling water are supplied from the front end-side end plate 170F side to the individual fuel-cell unit cells 110C and in which discharge gas and discharge water from the individual fuel-cell unit cells 110C are discharged outside from the front end-side end plate 170F on the front-end side. However, this is not limitative and various types of fuel cells may also be used such as a type in which reactant gases and cooling water are supplied from the front end-side end plate 170F and in which discharge gas and discharge water are discharged outside from the rear end-side end plate 170E, for example.

The fuel cell casing 120, as shown in the figure, has an opening on the front side and is closed by a casing end face (not shown) on the rear side. The cell stack 110 is housed in the fuel cell casing 120 with the above-described individual plates except the front end-side end plate 170F stacked thereon. The front end-side end plate 170F is fixed with bolts so as to close the front-end-side opening of the fuel cell casing 120. In this state, on a lower side of the cell stack 110 (in a z-axis minus direction in FIG. 3), the tension shafts 130 are set over a range from the front end-side end plate 170F up to the rear end-side end plate 170E. These tension shafts 130 are used to apply stacking loads to the fuel-cell unit cells 110C of the cell stack 110 and the above-described individual plates. As to assembly of the cell stack 110 and the individual plates into the fuel cell casing 120, pressing force in the stacking direction of the cell stack 110 is applied by a press shaft (not shown) from the closed casing end face side of the fuel cell casing 120 to the rear end-side end plate 170E, and the assembly is fixed by load adjustment screws 128 with the rear end-side end plate 170E in a pressed state. As a result, pressing force in the stacking direction is applied to the cell stack 110. As the front end-side end plate 170F is subject to the pressing force in the stacking direction as described above, the stacking state of the individual component members of the cell stack 110 is maintained while a contact state among the individual component members is maintained successfully. The front end-side end plate 170F, subject to pressing force for pressing the cell stack 110 in the stacking direction as described above, is manufactured as a die-cast article having such a thickness that a strength resisting the pressing force can be ensured, and the front end-side end plate 170F also includes ribs and the like for suppressing strength degradation due to the formation of the manifolds.

After the housing of the cell stack 110 into the fuel cell casing 120 and the pressing force adjustment by the tension shafts 130 and the load adjustment screws 128, the lower-end opening of the fuel cell casing 120 is closed by the lower cover 180. Then, the hydrogen pump 140 is set onto the front end-side end plate 170F, and auxiliary machines such as distal setting equipment for the air supply pipe and the cooling water supply pipe, pipe-line start point setting equipment for the anode off gas, the cathode off gas and the off cooling water are set to the front end-side end plate 170F as part of the fuel cell component members, followed by fixing the auxiliary machinery cover 125 to the front end-side end plate 170F with bolts. Thereafter, the fuel cell 100 is mounted on the vehicle-side stack frame 40F of the vehicle 10 as already described.

Figure 4:
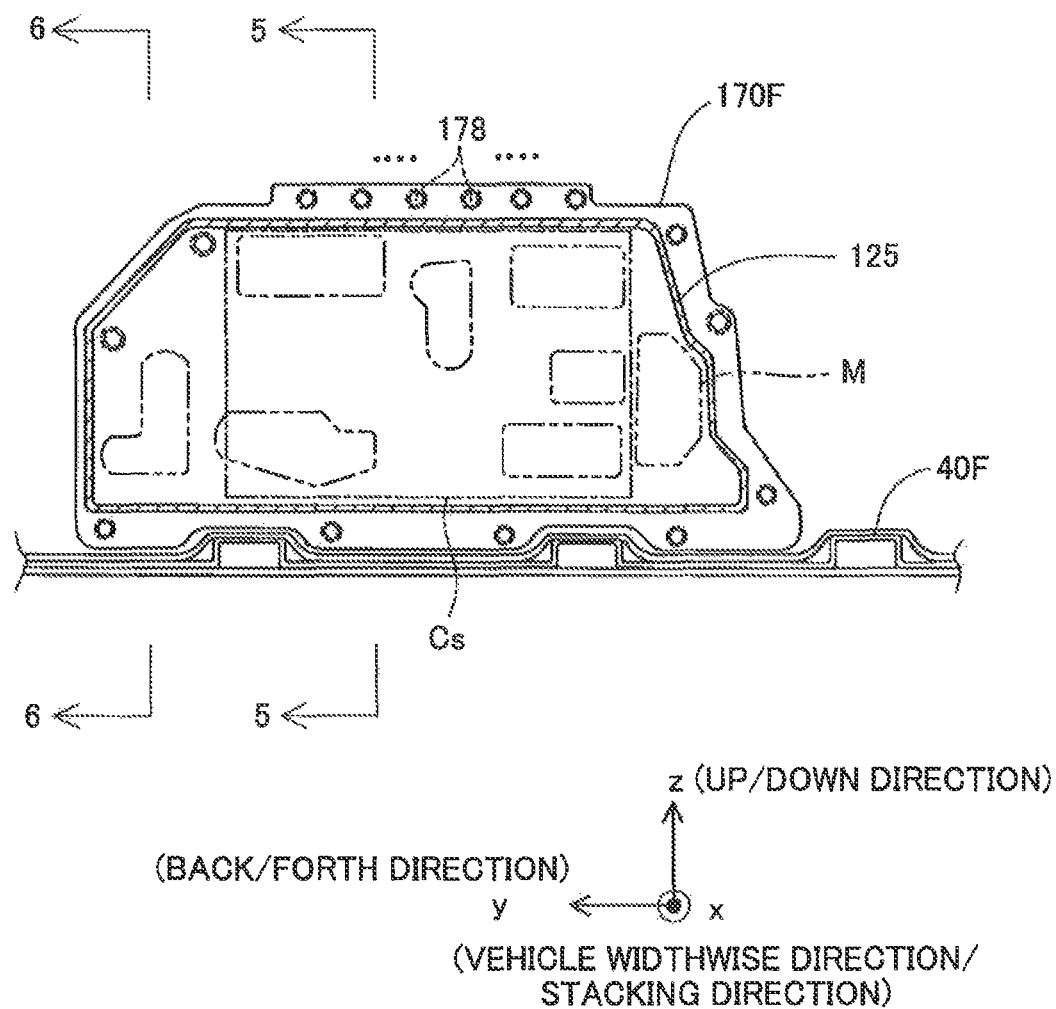
FIG. 4 is an explanatory view schematically showing a configuration of a front end-side end plate and its vicinity in a state where the fuel cells are mounted on a vehicle-side stack frame, as it is cut by line 4-4 of FIG. 3.

Next, a configuration around the front end-side end plate 170F in the state that the fuel cell 100 is mounted on the vehicle-side stack frame 40F will be described. FIG. 4 is an explanatory view schematically showing a configuration of the front end-side end plate 170F and its vicinities in the state that the fuel cell 100 is mounted on the vehicle-side stack frame 40F as it is cut by line 4-4 of FIG. 3. FIG. 5 is an explanatory view schematically showing a configuration of the front end-side end plate 170F and its vicinities, as it is cut by line 5-5 of FIG. 4. FIG. 6 is an explanatory view schematically showing a configuration of the front end-side end plate 170F and its vicinities, as it is cut by line 6-6 of FIG. 4.

As shown in FIGS. 3 and 4, the front end-side end plate 170F is fixed at its peripheral edge to the fuel cell casing 120 with bolts 178 so as to close the casing opening. The front end-side end plate 170F is formed into an outer peripheral shape larger than an outer peripheral shape of the casing that surrounds the front end-side opening of the fuel cell casing 120 (see FIG. 3), where with a cell region Cs located generally center as in a front view of the cell stack 110 viewed in the stacking direction, the outer peripheral shape of the front end-side end plate 170F is an expansion from the peripheral edge of the cell region. More specifically, on the lower end side of the front end-side end plate 170F, part of its outer periphery is recessed so as to avoid protrusions included for reinforcement in the vehicle-side stack frame 40F, and moreover the plate outer periphery is protruded between the protrusions of the vehicle-side stack frame 40F. Then, in regions interfering with the cell region Cs as well as in regions away from the cell region Cs, the front end-side end plate 170F has a plurality of manifolds M formed into various shapes relating to the supply and discharge of hydrogen gas, the supply and discharge of air, and the supply and discharge of cooling water. These manifolds M relate to the supply of gas and cooling water to the individual fuel-cell, unit cells 110C of the cell stack 110 via the front end-side current-collecting plate 160F, as well as to the discharge of gas and cooling water from the fuel-cell unit cells 110C. Routes and shapes of the manifolds M do not relate directly to the gist of the invention, so their description is omitted.

The cross-sectional configuration shown in FIG. 5 is obtained by vertically cutting the cross section with the cell region Cs partly included. As shown in the figure, the front end-side end plate 170F, on its one side having a contact surface with the front end-side current-collecting plate 160F, has a resin coating layer 170J over the entire range of the contact surface with the front end-side current-collecting plate 160F. This resin coating layer 170J is formed by using resin, having both insulative and scalable properties. At places where the manifolds M are formed, the resin coating layer 170J is formed so as to cover the manifold peripheral walls. The front end-side end plate 170F having such a resin coating layer 170J is an aluminum die-cast article manufactured by high pressure casting with use of aluminum. The resin coating layer 170J is formed by spraying, applying or the like of a resin, which is capable of fulfilling the insulative and scalable properties, to the contact surfaces of the front end-side end plate 170F for contact with the peripheral walls of the manifolds M and the front end-side current-collecting plate 160F. The resin capable of fulfilling the insulative and sealable properties may be PA (polyamide) or PPS (polyphenylenesulfide). In addition, for die-casting of the front end-side end plate 170F, titanium, stainless steel, alloys of these materials, aluminum alloys of these materials, or the like may be used instead of aluminum.

On the front end-side end plate 170F, the hydrogen pump 140 shown in FIG. 4 is set up and moreover, in regions away from the cell region Cs, fuel cell component members such as a collecting device serving as an auxiliary machine H for collecting the cathode off gas are set up on the opening side of the fuel cell casing 120. The front end-side end plate 170F, on which the auxiliary machine H is to be set up as described above, has its upper end made generally flush with an upper end wall 120u of the fuel cell casing 120 as shown in FIGS. 5 and 6. On the vehicle-side stack frame 40F side, i.e. vehicle driving road surface side, of the front end-side end plate 170F, the front end-side end plate 170F has its lower end closer to the vehicle-side stack frame 40F than a lower end wall 120d of the fuel cell casing 120. The front end-side end plate 170F is so formed that its separation distance D from the vehicle-side stack frame 40F, which covers the fuel cell 100 from below in the occupation area of the fuel cell 100, is set smaller than that of the lower end wall 120d of the fuel cell casing 120 or that of fuel cell component members set on the front end-side end plate 170F such as the auxiliary machine H and the auxiliary machinery cover 125 in the vicinity of the front end-side end plate 170F.

In the vehicle 10 of this embodiment, the vehicle-side stack frame 40F to be used for mounting of the fuel cell 100 is built on the unshown vehicle main frame, so as to extend over a range from the front end-side end plate 170F side to the other end side of the cell stack 110 along the stacking direction of the fuel-cell unit cells 110C in the occupation area of the fuel cell 100, In this state, the vehicle 10 of the embodiment is so structured that the lower end of the front end-side end plate 170F is placed closer to the vehicle-side stack frame 40F than fuel cell component members such as the auxiliary machine H in the vicinity of the front end-side end plate 170F. Since the vehicle-side stack frame 40F faces the driving road surface side of the vehicle interior 20, external force derived from some protrusion from the road surface or some ricocheting object can reach the vehicle-side stack frame 40F. In the event that external force has reached the occupation area of the fuel cell 100 in the vicinity of the front end-side end plate 170F as described above, the front end-side end plate 170F first receives the external force via the vehicle-side stack frame 40F because the separation distance D of the end plate from the vehicle-side stack frame 40F is the smallest. The front end-side end plate 170F that first receives the external force in this way has a strength against pressing force with which the cell stack 110 is pressed in the stacking direction, which means that external force that directly reaches from the vehicle-side stack, frame 40F to the fuel-cell unit cells 110C and the fuel cell component, members such as the auxiliary machine K in the vicinity of the front, end-side end plate 170F is reduced. As a result of this, according to the vehicle 10 of this embodiment, damage to the fuel cell component members such as the fuel-cell unit cells 110C and the auxiliary machine H can be reduced in the vicinity of the front end-side end plate 170F.

In the vehicle 10 of this embodiment, on the assumption that external force may reach the vehicle-side stack frame 40F in the direction of the vehicle driving road surface, the lower end of the front end-side end plate 170F is placed closest to the vehicle-side stack frame 40F on the lower side, i.e. vehicle driving road surface side, of the fuel cell (see FIGS. 5 and 6). Therefore, even if interference with some protrusion or ricocheting object derived from the vehicle driving road surface has occurred, damage to the fuel cell component members such as the fuel-cell unit cells 110C and the auxiliary machine H can be reduced in the vicinity of the front end-side end plate 170F.

In the vehicle 10 of this embodiment, as shown in FIG. 4, the lower end-side plate shape of the front end-side end plate 170F is set larger than the outer peripheral shape of fuel cell component members such as the fuel-cell unit cells 110C and the auxiliary machine H as viewed from the front in the stacking direction of the fuel-cell unit cells 110C. Therefore, by only providing the front end-side end plate 170F at a specified end portion (front end-side end portion) of the fuel-cell unit cells 110C, the lower end of the front end-side end plate 170F can be set closest to the vehicle-side stack frame 40F, conveniently.

The present invention is not limited to the above-described embodiment and may be implemented in various configurations unless these configurations depart from the gist of the invention. For example, technical features in the embodiment corresponding to technical features in the individual aspects described in the section of SUMMARY may be replaced or combined with one another, as required, in order to solve part or the entirety of the above-described problems or to achieve part or the entirety of the above-described advantageous effects. Moreover, those technical features may be deleted, as required, unless they are herein otherwise described as indispensable features.

In the vehicle 10 of the above embodiment, the fuel cell 100 is mounted generally center of the vehicle as shown in FIG. 1. However, the fuel cell 100 may be mounted on the vehicle rear end side near the trunk room or on the vehicle front end side near the front grille. In such a case, external force can reach the fuel cell 100 from the vehicle rear side or the vehicle front side. Therefore, it is appropriate that the vehicle-side stack frame 40F is provided also on left-and-right sides of the cell stack 110 as in a front view in the stacking direction of the fuel-cell unit cells 110C so that the outer peripheral shape of the front end-side end plate 170F is set larger than the outer peripheral shape of the fuel cell component members such as the fuel-cell unit cells 110C and the auxiliary machine H, thus making the front end-side end plate 170F proximate to the vehicle-side stack frame 40F, at both left-and-right sides of the front end-side end plate 170F.

What is claimed is:

1. A vehicle comprising:
    a fuel cell having a cell stack in which a plurality of fuel-cell unit cells are stacked in layers, and an end plate provided at one end portion of the cell stack to receive pressing force that is a force fixing the cell stack in a direction of the stacking of the fuel-cell unit cells, the end plate having such a strength as to resist the pressing force; and
    a vehicle-side stack frame on which the fuel cell is mounted in a vehicle underfloor region in such a mounting posture that the fuel-cell unit cells are stacked horizontally,
    wherein the vehicle-side stack frame is built over a range from an end plate side to the other end side of the cell stack along the stacking direction of the fuel-cell unit cells, wherein the fuel cell is housed in a fuel cell casing including a lower cover, and is fixed to the vehicle-side stack frame while the fuel cell is maintained above the vehicle-side stack frame, and wherein a shortest distance from the vehicle-side stack frame to a lower end of the end plate is smaller than a shortest distance from the vehicle-side stack frame to a lower end of an auxiliary machinery equipped on the fuel cell.

2. The vehicle in accordance with claim 1, wherein the lower end of the end plate is set apart for a predetermined distance vertically upward from the vehicle-side stack frame on a vehicle driving road surface side.

3. The vehicle in accordance with claim 1, wherein the end plate has a lower end side peripheral shape larger than a peripheral shape of whole of the auxiliary machinery equipped on the end plate of the fuel cell as viewed in the stacking direction of the cell stack.

4. The vehicle in accordance with claim 2, wherein the end plate has a lower end side peripheral shape larger than a peripheral shape of whole of the auxiliary machinery equipped on the end plate of the fuel cell as viewed in the stacking direction of the cell stack.

* * * * *